(12) United States Patent
Jikihara

(10) Patent No.: US 8,101,546 B2
(45) Date of Patent: Jan. 24, 2012

(54) THERMAL RECORDING MATERIAL

(75) Inventor: Atsushi Jikihara, Saijo (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 975 days.

(21) Appl. No.: 12/065,115

(22) PCT Filed: May 29, 2006

(86) PCT No.: PCT/JP2006/310639
§ 371 (c)(1),
(2), (4) Date: Feb. 28, 2008

(87) PCT Pub. No.: WO2007/026451
PCT Pub. Date: Mar. 8, 2007

(65) Prior Publication Data
US 2009/0264288 A1    Oct. 22, 2009

(30) Foreign Application Priority Data

Aug. 30, 2005  (JP) .................. 2005-249702

(51) Int. Cl.
*B41M 5/337* (2006.01)
(52) U.S. Cl. ...................... 503/207; 503/214
(58) Field of Classification Search .............. None
See application file for complete search history.

(56) References Cited

U.S. PATENT DOCUMENTS 4,833,121 A * 5/1989 Ikeda et al. ........ 503/214
2003/0224935 A1 12/2003 Watanabe et al.

FOREIGN PATENT DOCUMENTS

| CN | 1459382 A | 12/2003 |
|---|---|---|
| JP | 58-179691 | 10/1983 |
| JP | 8 048076 | 2/1996 |
| JP | 8 48076 | 2/1996 |
| JP | 8 324115 | 12/1996 |
| JP | 11 321103 | 11/1999 |
| JP | 2003 19864 | 1/2003 |
| JP | 2003 019864 | 1/2003 |
| JP | 2004-359802 | 12/2004 |
| JP | 2005 179390 | 7/2005 |

* cited by examiner

*Primary Examiner* — Bruce H Hess
(74) *Attorney, Agent, or Firm* — Oblon, Spivak, McClelland, Maier & Neustadt, L.L.P.

(57) ABSTRACT

In the present invention, a dispersion that has excellent dispersion efficiency, shows hardly any premature graying, and exhibits excellent dispersion stability and storage stability when heated is prepared, and the thermal recording material excellent in color developing sensitivity and whiteness of the background is provided.

The present invention provides a thermal recording material including a support and a thermosensitive coloring layer that is provided on the support and contains an electron-donating colorless dye and an electron-accepting compound, wherein the thermosensitive coloring layer contains a polyvinyl alcohol-based resin (A) containing a carboxyl group that has been produced by saponification of polyvinyl ester obtained by the polymerization in the presence of aldehydes or ketones and that has an absorbance at 280 nm of 0.20 to 0.85 obtained from an ultraviolet absorption spectrum of a 0.1 wt % aqueous solution thereof.

19 Claims, No Drawings

THERMAL RECORDING MATERIAL

TECHNICAL FIELD

The present invention relates to the thermal recording material that shows excellent color developing sensitivity and whiteness of the background when the thermal recording material is configured as thermal paper by obtaining and using a dispersion that contains particles with a small particle diameter, shows hardly any premature graying, and exhibits excellent dispersion stability and storage stability even when heated.

BACKGROUND ART

Recently, in the field of information recording, a wide variety of recording materials have been researched, developed and utilized in accordance with diversification of information and expansion of the needs. Among them, thermal recording materials have advantages that (1) it can record images simply by a heating process only and (2) a mechanism of a required device is simple so that the device can be downsized easily and the recording materials are inexpensive and easy to be handled. Therefore, the thermal recording materials are used in various fields, such as a field of information processing (an output such as a desk calculator, or a computer), a field of recorders for medical measurements, a field of low-speed and high speed facsimiles, a field of automatic machines for tickets (train tickets, bus tickets, entrance tickets, etc.), a field of heat-sensitive copying machines, and a field of labels in a POS system.

For these thermal recording materials, it is required to develop color rapidly with a high density and to have high fastness of a developed image and background. For the means for developing the color rapidly with a high density (enhancing sensitivity), it has been studied to add a developer having a low melting point, or a material, as a sensitizer, that induces melting point depression by melting with a developer or a leuco dye, which is an electron-donating colorless dye. Basically, lowering the melting point of the developer and the sensitizer is fairly efficient for enhancing sensitivity, but it has a disadvantage that background fog (reduction of whiteness) is produced at a low temperature in contrast to improvement of the sensitivity, because the color developing temperature decreases.

In the process for producing the thermal recording material, a dispersion that contains a heat-sensitive dye and a developer is prepared. For other means for enhancing sensitivity of the thermal recording material, various techniques have been proposed in which a leuco dye is microparticulated so that the sensitivity of the thermal recording material increases. For example, use of polyvinyl alcohol containing a sulfonic group (patent document 1), use of polyvinyl alcohol containing a carboxyl group (patent document 2), and use of a resin composition of polyvinyl alcohol and an olefin/maleic acid copolymer (patent document 3), as a dispersant for a heat-sensitive dye or the like, have been proposed. In addition, in order to improve the whiteness and the background fog under high humidity, it has been proposed that a dispersion containing a heat-sensitive dye is subjected to heat-treatment at 40° C. or more for 3 hours or more (patent document 4).

However, these past proposals still have some problems. The problems are that the premature graying of the dispersion is occurred more drastically as downsizing of the size of the dispersed particles (premature graying means the phenomenon that a dispersion becomes darker as downsizing of dye particles), that the viscosity of the dispersion easily becomes high with time because the viscosity stability when the obtained dispersion is left to stand is insufficient, and that when the dispersion is heat-treated to improve the whiteness and the background fog under high-humidity environment, the dispersion state becomes unstable, resulting in reaggregation, viscosity increase, gelation, and the like. In the conventional art, a dispersion that contains particles with a small particle diameter, shows hardly any premature graying, and exhibits excellent dispersion stability and storage stability when heated has not been obtained yet.

Patent document 1: JP-S58-179691A
Patent document 2: JP-H8-48076A
Patent document 3: JP-H11-321103A
Patent document 4: JP2004-359802A

DISCLOSURE OF INVENTION

Problem to be Solved by the Invention

It is an object of the present invention to provide the thermal recording material that shows excellent color developing sensitivity and whiteness of the background when the thermal recording material is configured as thermal paper, after a dispersion therefor is obtained that has excellent dispersion efficiency, shows hardly any premature graying, and exhibits excellent dispersion stability and storage stability when heated.

Means for Solving the Problem

The present inventor has found that the above problem can be solved by the thermal recording material characterized in that the thermal recording material includes a support and a thermosensitive coloring layer that is provided on the support and contains an electron-donating colorless dye and an electron-accepting compound, and in that the thermosensitive coloring layer contains a polyvinyl alcohol-based resin containing a carboxyl group that has been produced by saponification of polyvinyl ester obtained by the polymerization in the presence of aldehydes or ketones and that has an absorbance at 280 nm of 0.20 to 0.85 obtained from an ultraviolet absorption spectrum of a 0.1 wt % aqueous solution thereof.

Here, in a preferred embodiment, the thermosensitive coloring layer contains 0.01 to 10 parts by weight of acetylene glycol (B) represented by the following formula (I) relative to 100 parts by weight of the polyvinyl alcohol-based resin (A) containing a carboxyl group, or 0.01 to 10 parts by weight of an ethoxylate (C) of acetylene glycol represented by the following formula (II) relative to 100 parts by weight of the polyvinyl alcohol-based resin (A) containing a carboxyl group.

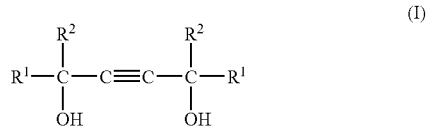
(I)

In the formula, R1 and R2 each represent an alkyl group having 1 to 4 carbons.

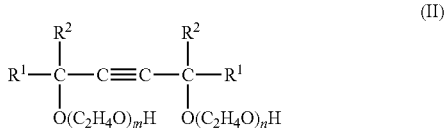

(II)

In the formula, R1 and R2 each represent an alkyl group having 1 to 4 carbons, m and n each are a natural number of 1 to 25, and m+n is 1 to 40.

Moreover, in a more preferred embodiment, the thermal recording material contains a salt (D) of an olefin/maleic acid copolymer. 0.01 to 5 parts by weight of the salt (D) of an olefin/maleic acid copolymer is contained relative to 100 parts by weight of the polyvinyl alcohol-based resin (A) containing a carboxyl group.

Effect of the Invention

In the present invention, a thermal recording material having excellent color developing sensitivity and whiteness of the background is obtained when the thermal recording material is configured as thermal paper by obtaining and using a dispersion that contains particles with a small particle diameter, shows hardly any premature graying, and exhibits excellent dispersion stability and storage stability when heated. Hence, the present invention has a high industrial value.

BEST MODE FOR CARRYING OUT THE INVENTION

The polyvinyl alcohol-based resin (A) containing a carboxyl group used in the present invention is the one that is produced by the saponification of polyvinyl ester obtained by the copolymerization of an unsaturated monomer having a carboxyl group with a vinyl ester type monomer in the presence of aldehydes or ketones. The polyvinyl alcohol-based resin (A) containing a carboxyl group has an absorbance at 280 nm of 0.20 to 0.85 obtained from an ultraviolet absorption spectrum of a 0.1 wt % aqueous solution thereof.

As the vinyl ester type monomer, vinyl formate, vinyl acetate, vinyl propionate, vinyl pivalate, and vinyl versatate are exemplified, and vinyl acetate is preferably used.

As the unsaturated monomer having a carboxyl group, monomer units derived from fumaric acid, maleic acid, itaconic acid, maleic anhydride, fumaric anhydride, trimellitic anhydride, itaconic anhydride, and the like are exemplified. Among these monomers, from the view point of ready availability and reactivity of the copolymerization, maleic anhydride, itaconic acid, and half-ester derived from maleic anhydride are more preferable. The content S of these monomer units having a carboxyl group relative to total monomer units in the polyvinyl alcohol-based resin (A) containing a carboxyl group is preferably 0.05 to 3 mole %, more preferably 0.1 to 2.5 mole %, and further more preferably 0.5 to 2 mole %. When the content S of the monomer units having a carboxyl group in the polyvinyl alcohol-based resin (A) is less than 0.05 mole %, the viscosity of the obtained dispersion becomes high, and thereby coating activity of the coating material tends to be inferior. On the other hand, when the content S of the monomer units having a carboxyl group exceeds 3 mole %, the whiteness of the obtained dispersion becomes low, and thereby background fog of the thermal paper may become worse.

For the polymerization of the vinyl ester type monomer, as aldehydes or ketones which coexists, aldehydes such as acetaldehyde, propionaldehyde, butyraldehyde, and benzaldehyde; and ketones such as acetone, methyl ethyl ketone, hexanone, and cyclohexanone are exemplified. Among them, acetaldehyde is preferably used. The amount of the aldehydes or ketones to be added is determined depending on the chain transfer constant of the aldehydes or ketones to be added and desired polymerization degree of the vinyl ester-based polymer, and in general, is desirably 0.1 to 10 wt % relative to the vinyl ester type monomer. In addition, the polyvinyl alcohol-based resin (A) containing a carboxyl group essentially has an absorbance at 280 nm of 0.20 to 0.85 obtained from an ultraviolet absorption spectrum of a 0.1 wt % aqueous solution thereof. The absorbance at 280 nm obtained from the ultraviolet absorption spectrum of the 0.1 wt % aqueous solution is more preferably 0.30 to 0.75, and further more preferably 0.50 to 0.70. When the absorbance at 280 nm obtained from the ultraviolet absorption spectrum of the 0.1 wt % aqueous solution is 0.25 or less, dispersion efficiency becomes inferior and thereby it makes it impossible to crush the particles into desired small particle size. On the other hand, when the absorbance at 280 nm obtained from the ultraviolet absorption spectrum of the 0.1 wt % aqueous solution exceeds 0.85, the stability of the dispersion when heated becomes low.

For the copolymerization of the vinyl ester type monomer, conventionally known methods such as bulk polymerization method, solution polymerization method, suspension polymerization method, and emulsion polymerization method can be employed. Among them, the bulk polymerization method in which polymerization is carried out without solvent, or the solution polymerization method in which polymerization is carried out in a solvent such as alcohol is typically employed. When a polymer with the high polymerization degree is to be obtained, the emulsion polymerization method should be employed. As the alcohol used as the solvent for the solution polymerization, lower alcohols such as methanol, ethanol, and propanol are exemplified, and among these, methanol is preferably used. As the initiator used for the polymerization, known initiators, for example, azo-type initiators such as 2,2'-azobisisobutyronitrile, 2,2'-azobis(2,4-dimethylvaleronitrile), and 2,2'-azobis(4-methoxy-2,4-dimethylvaleronitrile), or peroxide-type initiators such as benzoyl peroxide, and n-propylperoxydicarbonate are exemplified. The polymerization temperature is not particularly limited, and the suitable temperature range is −30 to 150° C.

For the method for the saponification of the vinyl ester-based polymer, any conventionally known method can be suitably applied. Typically, a method in which the vinyl ester-based polymer is saponified in an alcohol solution thereof using a base catalyst or an acid catalyst is employed. As the alcohol used as the solvent of the saponification, methanol is preferable. In addition to this, as the solvent of the saponification, not only an anhydrous solvent but also a solvent containing a small amount of water can be used depending on the purpose. Moreover, a solvent containing the other organic solvents such as methyl acetate, and ethyl acetate may be used. With respect to the saponification temperature, it is selected generally from the range of 10 to 70° C. As the catalyst for the saponification, the base catalyst such as sodium hydroxide, potassium hydroxide, sodium methoxide, or potassium methoxide is preferable. The amount of the catalyst for the saponification to be used is appropriately determined depending on the desired saponification degree, water content, and the like, and it is desirable that the amount is 0.001 or more, and preferably 0.002 or more, in a molar ratio relative to vinyl ester units in the polymer.

The value that is measured on a 10 wt % solution of the polyvinyl alcohol-based resin (A) containing a carboxyl group used in the present invention with a B-type viscometer at 20° C. at a rotor rotation of 60 rpm is preferably 5 to 20 mPas, more preferably 7 to 15 mPas, and further more preferably 8 to 13 mPas. When the viscosity measured on the 10 wt % solution with a B-type viscometer at 20° C. is less than 5 mPas, the polymerization degree of the polyvinyl alcohol-based resin (A) containing a carboxyl group is excessively small. Consequently, the feature of protective colloid as a dispersant becomes insufficient and the particle size does not become small, which results in inferior viscosity stability when the dispersion is left to stand. On the other hand, when the viscosity exceeds 20 mPas, the viscosity of the obtained dispersion becomes high.

The saponification degree of the polyvinyl alcohol-based resin (A) containing a carboxyl group used in the present invention is not particularly limited, and is preferably 70 to 95 mole %, more preferably 75 to 93 mole %, and further more preferably 80 to 90 mole %. When the saponification degree of the polyvinyl alcohol-based resin (A) is less than 70 mole %, the solubility of the polyvinyl alcohol-based resin (A) in the alcohol is excessively inferior, and thereby the resistance to alcohol of the obtained thermal paper tends to be extremely degraded. On the other hand, when the saponification degree exceeds 95 mole %, the adsorbed amount of the polyvinyl alcohol-based resin (A) in the dispersoid is excessively small, and thereby it may become impossible to crush particles into sufficiently small particle size.

In a preferred embodiment of the present invention, acetylene glycol (B) represented by the following formula (I) is contained.

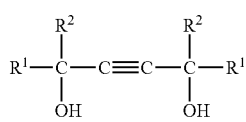

(I)

In the formula, R1 and R2 each represent an alkyl group having 1 to 4 carbons.

As the acetylene glycol (B) represented by the above formula (I), 5,8-dimethyl-6-dodecyne-5,8-diol, 2,4,7,9-tetramethyl-5-decyne-4,7-diol, 4,7-dimethyl-5-decyne-4,7-diol, 2,3,6,7-tetramethyl-4-octyne-3,6-diol, 3,6-diethyl-4-octyne-3,6-diol, 3,6-dimethyl-4-octyne-3,6-diol, 2,5-dimethyl-3-hexyne-2,5-diol, and the like are particularly exemplified.

The recording material of the present invention contains 0.01 to 10 parts by weight of the acetylene glycol (B) represented by the above formula (I) relative to 100 parts by weigh of the polyvinyl alcohol-based resin (A) containing a carboxyl group. With respective to the amount of the above-mentioned (A) and (B) to be incorporated, 0.3 to 7 parts by weight of (B) relative to 100 parts by weight of (A) is more preferable, and 0.5 to 5 parts by weight of (B) relative to 100 parts by weight of (A) is further more preferable. When the content of the above-mentioned acetylene glycol (B) is less than 0.01 parts by weight, the dispersion efficiency and the dispersion stability when heated tend to be inferior. On the other hand, when the content of the above-mentioned acetylene glycol (B) exceeds 10 parts by weight, the whiteness of the obtained dispersion tends to be degraded.

In a preferred embodiment of the present invention, an ethoxylate of acetylene glycol (C) represented by the following formula (II) is contained.

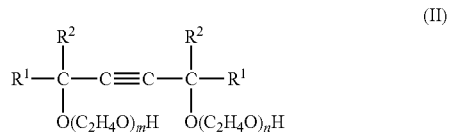

(II)

In the formula, R1 and R2 each represent an alkyl group having 1 to 4 carbons, m and n each are a natural number of 1 to 25, and m+n is 1 to 40.

As the ethoxylate of acetylene glycol represented by the above formula (II), ethylene oxide derivatives of the above-mentioned acetylene glycol can be exemplified. The addition mole numbers of ethylene oxide units in the acetylene glycol are each 1 to 25 mole. The total mole number of these is 1 to 40 mole, and preferably 3 to 30 mole. When the total mole number of ethylene oxide exceeds 40 mole, degree of hydrophilicity becomes excessively high, and thereby bubbles may be generated during rapid application of the coating for the thermosensitive layer.

In a preferred embodiment, the thermal recording material of the present invention contains a salt (D) of an olefin/maleic acid copolymer. As the water-soluble salt of the olefin/maleic acid (anhydride) copolymer, it is not particularly limited, and an ammonium salt, sodium salt, calcium salt, or the like of a diisobutylene/maleic acid (anhydride) copolymer, pentene/maleic acid (anhydride) copolymer, hexene/maleic acid (anhydride) copolymer, nonene/maleic acid (anhydride) copolymer, or the like can be exemplified, and a diisobutylene/maleic acid copolymer is preferably used.

When the thermal recording material of the present invention contains the salt (D) of an olefin/maleic acid copolymer, the content of (D) is preferably 0.01 to 5 parts by weight relative to 100 parts by weight of the polyvinyl alcohol-based resin (A) containing a carboxyl group. The content of (D) relative to 100 parts by weight of (A) is more preferably 0.05 to 3 parts by weight, and further more preferably 0.1 to 2.5 parts by weight. When the content of the salt (D) of an olefin/maleic acid copolymer is less than 0.01 parts by weight, the stability of the dispersion during heat-treatment tends to be inferior. On the other hand, when the content of the salt (D) of an olefin/maleic acid copolymer exceeds 5 parts by weight, the whiteness of the dispersion tends to be degraded.

The heat-sensitive dye or the developer is dispersed using a sand grinder containing lots of glass beads with the average diameter of 0.2 to 3 mm (preferably 0.3 to 0.8 mm) therein. According to the present invention, an aqueous dispersion in which a heat-sensitive dye or a developer with the average diameter of 0.1 to 1 μm (preferably 0.2 to 0.7 μm, more preferably 0.3 to 0.5 μm) are contained as dispersoids can be obtained by using the polyvinyl alcohol-based resin (A) containing a carboxyl group.

The electron-donating colorless dye used in the present invention is not particularly limited, as long as it can be used in common pressure-sensitive recording paper or common thermosensitive recording paper. Specific examples include triarylmethane compounds such as 3,3-bis(p-dimethylaminophenyl)-6-dimethylaminophthalide (crystal violet lactone), 3-(p-dimethylaminophenyl)-3-(1,2-dimethylindol-3-yl)phthalide, 3-(p-dimethylaminophenyl)-3-(2-phenylindol-3-yl)phthalide, and 3,3-bis(9-ethylcarbazol-3-yl)-5-dimethylaminophthalide; diphenylmethane compounds such as 4,4'-bisdimethylaminobenzhydrin benzyl ether, and N-halophenylleucoauramine; xanthene compounds such as rhodamine B-anilinolactam, 3-diethylamino-7-benzylaminofluoran, 3-diethyliamino-7-butylaminofluoran, 3-diethylamino-7-(chloroanilino)fluoran, 3-diethylamino-6-methyl-7-anilinofluoran, 3-piperidino-6-methyl-7-anilinofluoran, 3-ethyltolylamino-6-methyl-7-anilinofluoran, 3-cyclohexyl-methylamino-6-methyl-7-anilinofluoran, 3-diethylamino-6-chloro-7-(β-ethoxyethyl)aminofluoran, 3-diethylamino-6-chloro-7-(γ-chloropropyl)aminofluoran, 3-(N-ethyl-N-isoamyl)-6-methyl-7-phenylaminofluoran, and 3-dibutylamino-6-methyl-7-anilinofluoran; thiazine compounds such as benzoylleucomethylene blue, and p-nitrobenzoylleucomethylene blue; and spiro compounds such as 3-methyl-spiro-dinaphthopyran, 3-ethyl-spiro-dinaphthopyran, 3-benzylspiro-dinaphthopyran, and 3-methylnaphtho-(3-methoxy-benzo)-spiropyran, and these are used singly or as a mixture of two or more kinds. These heat-sensitive dyes are appropriately selected and used depending on the application of the thermal recording material.

As the electron-accepting compound used in the present invention, phenol derivatives and aromatic carboxylic acid derivatives are preferable, and bisphenols are particularly preferable. In specific, as the phenols, p-octylphenol, p-tert-butylphenol, p-phenylphenol, 1,1-bis(p-hydroxyphenyl)propane, 2,2-bis(p-hydroxyphenyl)propane, 1,1-bis(p-hydroxyphenyl)pentane, 1,1-bis(p-hydroxyphenyl)hexane, 2,2-bis(p-hydroxyphenyl)hexane, 1,1-bis(p-hydroxyphenyl)-2-ethyl-hexane, 2,2-bis(4-hydroxy-3,5-dichlorophenyl) propane, and dihydroxydiphenylether; and as the aromatic carboxylic acid derivatives, p-hydroxybenzoic acid, ethyl p-hydroxybenzoate, butyl p-hydroxybenzoate, 3,5-di-tert-butylsalicylic acid, 3,5-di-α-methylbenzylsalicylic acid, and multivalent metal salts of the above-mentioned carboxylic acid are exemplified.

In the present invention, it is preferable that an aqueous binder is used for the thermosensitive coloring layer. The aqueous binder is not particularly limited and all known in the art can be used. The preferable aqueous binder is the one that does not cause color development of liquid, aggregation in liquid and viscosity increment when the aqueous binder is mixed with each of the dispersions of the heat-sensitive dye and the above-mentioned developer. Specific examples thereof include, starch, and starch derivatives; cellulose derivatives such as hydroxymethylcellulose, hydroxyethylcellulose, carboxymethylcellulose, methylcellulose and ethylcellulose; water-soluble polymers such as modified polyvinyl alcohol, polyvinyl alcohol, poly(sodium acrylate), polyvinylpyrrolidone, acrylamide/acrylic acid ester copolymers, acrylamide/acrylic acid ester/methacrylic acid ternary copolymers, alkali metal salts of styrene/maleic anhydride copolymers, alkali metal salts of isobutylene/maleic anhydride copolymers, polyacrylamide, sodium alginate, gelatin and casein; emulsions of polyvinyl acetate, polyurethane, polyacrylic acid, polyacrylic acid esters, vinyl chloride/vinyl acetate copolymers, polybutyl methacrylate, ethylene/vinyl acetate copolymers and the like; and latices of styrene/butadiene copolymers, styrene/butadiene/acrylic acid ester copolymers and the like. The preferable amount of the aqueous binder to be added is 1 to 20 parts by weight relative to 100 parts by weight of the total amount of the heat-sensitive dye and the developer.

To the thermosensitive coloring layer constituting the present invention, can be added the following various substances besides the above-mentioned electron-donating colorless dye and the electron-accepting compound, if necessary. As the additional components to be added to the thermal recording material to improve coating aptitude, whiteness, color developing sensitivity, dispersibility and the like, for example, fillers, surfactants, heat-fusible substances (or lubricants), antifoamers, dispersants, wetting agents, pressure color development inhibitors and the like can be used. In the present invention, for the method for forming the thermosensitive coloring layer, known coating methods such as air-knife coating, plating, gravure coating, roll coating, spraying, dipping, bar coating, and extrusion coating can be used.

In the present invention, the support material for the thermal recording material is not particularly limited. For example, paper, synthetic fiber paper, synthetic resin film, and the like can be appropriately used. Among them, it is generally preferable that paper is used.

EXAMPLE

Furthermore, the present invention will be explained more specifically based on Examples. It should be noted that hereinafter "part(s)" and "%" means "part(s) by weight" and "wt %", respectively, unless otherwise specified I. Production and Evaluation of PVA PVA was produced according to the following method, and the viscosity of the 10 wt % aqueous solution thereof, saponification degree, content S (mole %) of monomer units having carboxyl group, and absorbance at 280 nm obtained from the ultraviolet absorption spectrum of the 0.1 wt % aqueous solution were determined.
[Saponification Degree]
The saponification degree of PVA was measured in accordance with the method described in JIS-K6726.
[Viscosity of 10 Wt % Aqueous Solution]
The viscosity was determined by the measurement on the 10 wt % aqueous solution of the polyvinyl alcohol-based resin (A) containing a carboxyl group, with a B-type Viscometer manufactured by Tokyo Keiki Kogyo Co., Ltd. at 20° C. at a rotor rotation of 60 rpm.
[Content of Monomer Units Having Carboxyl Group]
After a gelled matter obtained by the saponification of the vinyl ester-based polymer was crushed, the crushed matter was washed in a Soxhlet extractor with methanol for 3 days. Then, the washed matter was dried under reduced pressure at 80° C. for 3 days to give purified PVA. Then, a measurement sample was prepared by dissolving the purified PVA in a heavy water solvent. An NMR spectroscopic measurement was carried out with 500 MHz $^1$H-NMR equipment (manufactured by JEOL Ltd.; GX-500) and the content S (mole %) of monomer units having carboxyl group is determined.
[Measurement of Ultraviolet Absorption Spectrum of 0.1 Wt % Aqueous Solution]
The 0.1 wt % aqueous solution of the polyvinyl alcohol-based resin (A) containing a carboxyl group was prepared, and the absorbance at 280 nm was measured at 20° C. with a spectrophotometer (manufactured by Hitachi Ltd.; U-3000).
PVA-1
To a 6 L reaction vessel equipped with a reflux condenser, a stirrer, a thermometer, a nitrogen introduction tube, an inlet for liquid to be added later, and a pump, were introduced 2400 parts of vinyl acetate, 600 parts of methanol, 2.2 parts of itaconic acid, and 150 parts of acetaldehyde. While the polymerization solution was stirred, the inside of the system was replaced with nitrogen. The polymerization solution was heated. When the temperature kept constantly at 60° C., 4.5 parts of 2,2'-azobisisobutyronitrile (hereinafter abbreviated as AIBN) was added thereto to initiate polymerization. From the starting point of the polymerization, reaction was carried out, while 320 parts of a 25 wt % methanol solution of itaconic acid was added into the system and the solid concentration in the system was analyzed. 5 hours later, the polymerization was terminated by cooling the reaction vessel. The polymerization rate at the termination of the polymerization was 90%. The polymer was precipitated by dropping the obtained polymerization paste into n-hexane. The precipitated polymer was collected, dissolved in acetone, and subjected to purification operation by reprecipitation in n-hexane three times. Furthermore, the polymer was dissolved in acetone, and dropped into distilled water. The water was boiled so that the polymer was purified. The polymer was dried at 60° C. to give purified polyvinyl acetate (hereinafter abbreviated as PVAc).

Then, a 45% methanol solution of the purified PVAc was prepared. The saponification reaction was carried out for 60 min by adding a 10% methanol solution of sodium hydroxide with the methanol solution of the purified PVAc being stirred at 40° C. so that the molar ratio of sodium hydroxide relative to vinyl acetate units in PVAc became 0.045. After the obtained gelled matter was crushed, the crushed matter was washed in a Soxhlet extractor with methanol for 3 days. Then, the washed matter was dried under reduced pressure at 80° C. for 3 days to give purified PVA. The saponification degree of the PVA was measured in accordance with JIS K6726, which is a conventional method, and found to be 88 mole %. The viscosity of the 10 wt % aqueous solution was 10 mPas. The content S of carboxyl groups in the purified PVA was determined by the $^1$H-NMR spectroscopic measurement and found to be 2 mole % relative to the total monomer units. Moreover, the absorbance at 280 nm obtained from the ultraviolet absorption spectra of the 0.1 wt % aqueous solution was measured and found to be 0.66. Hereinafter, the PVA obtained above is referred to as PVA-1.

PVA-2 to 19

Several kinds of PVA were prepared in a manner similar to PVA-1 except that the conditions of the polymerization reaction (an addition amount of vinyl acetate, methanol and acetaldehyde, a kind and addition amount of the monomer having a carboxyl group, a kind and used amount of the polymerization initiator, and polymerization time) were changed as shown in Table 1. The Properties of the obtained PVA are shown in Table 1.

PVA-20

To a 10 L reaction vessel equipped with a reflux condenser, a stirrer, a thermometer, a nitrogen introduction tube, an inlet for liquid to be added later, and a pump, were introduced 900 parts of vinyl acetate, 4100 parts of methanol, and 0.8 parts of itaconic acid. While the polymerization solution was stirred, the inside of the system was replaced with nitrogen. The reaction solution was heated. When the temperature kept constantly at 60° C., a 5 g/L methanol solution of n-propylperoxydicarbonate (hereinafter abbreviated as NPP) was added thereto to initiate polymerization (70 mL of the methanol solution was added thereto from the initiation to the termination of the polymerization). From the starting point of the polymerization, reaction was carried out, while 120 parts of a 25 wt % methanol solution of itaconic acid was added into the system and the solid concentration in the system was analyzed. 5 hours later, the polymerization was terminated by cooling the reaction vessel. The polymerization rate at the termination of the polymerization was 90%. The polymer was precipitated by dropping the obtained polymerization paste into n-hexane. The precipitated polymer was collected, dissolved in acetone, and subjected to purification operation by reprecipitation in n-hexane three times. Furthermore, the polymer was dissolved in acetone, and dropped into distilled water. The water was boiled so that the polymer was purified. The polymer was dried at 60° C. to give purified polyvinyl acetate (hereinafter abbreviated as PVAc).

Then, a 45% methanol solution of the purified PVAc was prepared. The saponification reaction was carried out for 60 min by adding a 10% methanol solution of sodium hydroxide with the methanol solution of the purified PVAc being stirred at 40° C. so that the molar ratio of sodium hydroxide relative to vinyl acetate units in PVAc became 0.045. After the obtained gelled matter was crushed, the crushed matter was washed in a Soxhlet extractor with methanol for 3 days. Then, the washed matter was dried under reduced pressure at 80° C. for 3 days to give purified PVA. The saponification degree of the PVA was measured in accordance with JIS K6726, which is a conventional method, and found to be 88 mole %. The viscosity of the 10 wt % aqueous solution was 10 mPas. The content S of carboxyl groups in the purified PVA was determined by the $^1$H-NMR spectroscopic measurement and found to be 2 mole % relative to the total monomer units. Moreover, the absorbance at 280 nm obtained from the ultraviolet absorption spectra of the 0.1 wt % aqueous solution was measured and found to be 0.04. Hereinafter, the PVA obtained above is referred to as PVA-20.

PVA-21

To a 10 L reaction vessel equipped with a reflux condenser, a stirrer, a thermometer, a nitrogen introduction tube, an inlet for liquid to be added later, and a pump, were introduced 900 parts of vinyl acetate, and 4100 parts of methanol. While the polymerization solution was stirred, the inside of the system was replaced with nitrogen. The reaction solution was heated. When the temperature kept constantly at 60° C., a 5 g/L methanol solution of n-propylperoxydicarbonate (hereinafter abbreviated as NPP) was added thereto to initiate polymerization (70 mL of the methanol solution was added thereto from the initiation to the termination of the polymerization). From the starting point of the polymerization, reaction was carried out while the solid concentration in the system was analyzed. 5 hours later, the polymerization was terminated by cooling the reaction vessel. The polymerization rate at the termination of the polymerization was 90%. The polymer was precipitated by dropping the obtained polymerization paste into n-hexane. The precipitated polymer was collected, dissolved in acetone, and subjected to purification operation by reprecipitation in n-hexane three times. Furthermore, the polymer was dissolved in acetone, and dropped into distilled water. The water was boiled so that the polymer was purified. The polymer was dried at 60° C. to give purified polyvinyl acetate (hereinafter abbreviated as PVAc).

Then, a 45% methanol solution of the purified PVAc was prepared. The saponification reaction was carried out for 60 min by adding a 10% methanol solution of sodium hydroxide with the methanol solution of the purified PVAc being stirred at 40° C. so that the molar ratio of sodium hydroxide relative to vinyl acetate units in PVAc became 0.025. After the obtained gelled matter was crushed, the crushed matter was washed in a Soxhlet extractor with methanol for 3 days. Then, the washed matter was dried under reduced pressure at 80° C. for 3 days to give purified PVA. The saponification degree of the PVA was measured in accordance with JIS K6726, which is a conventional method, and found to be 88 mole %. The viscosity of the 10 wt % aqueous solution was 10 mPas. Moreover, the absorbance at 280 nm obtained from the ultraviolet absorption spectra of the 0.1 wt % aqueous solution was measured and found to be 0.01. Hereinafter, the PVA obtained above is referred to as PVA-21.

II. Production and Evaluation of Thermal Recording Material

Example 1

(1) Preparation of Coating Liquid

Dispersing of Heat-Sensitive Dye and Developer

A. Preparation of aqueous Dispersion of Heat-Sensitive Dye

240 Parts of a leuco dye (manufactured by Yamamoto Chemicals Inc., trade name: ODB-2)

240 Parts of an aqueous solution of PVA-1 (concentration 10 wt %)

0.2 Parts of 2,4,7,9-tetramethyl-5-decyne-4,7-diol (manufactured by Air Products, Inc., trade name: Surfynol 104E)

180 Parts of distilled water

B. Preparation of Aqueous Dispersion of Developer

240 Parts of bisphenol S (manufactured by Nippon Soda Co., Ltd., trade name: D-8)

240 Parts of an aqueous solution of PVA-1 (concentration 15 wt %)

0.5 Parts of 2,4,7,9-tetramethyl-5-decyne-4,7-diol (manufactured by Air Products, Inc., trade name: Surfynol 104E)

180 Parts of distilled water

The above-described aqueous dispersions A and B were prepared separately, and they were preliminarily stirred in beakers for 15 min. Then, each of the aqueous dispersions A and B was transferred into a sand mill dispersing machine (manufactured by AIMEX Co., Ltd., Ready-mill type NVM-03), and glass beads (made of soda quartz glass, diameter of 0.5 mm) was added thereto (filling rate of 82%). Each of them was dispersed at a high rotation speed (3400 rpm) under cooling with a discharge rate of 55 cc/min for 20 min, and the properties of the obtained aqueous dispersion A of the heat-sensitive dye were evaluated by the following method.

Particle Diameter of Dispersoid

The particle diameter after dispersing was started was measured with a laser diffraction particle size analyzer (manufactured by Shimadzu Corporation, model: SALD-2200).

Viscosity of Aqueous Dispersion

The viscosity of the aqueous dispersion that had been dispersed for 20 min and then left to stand for about 1 hour was measured at 20° C.

Whiteness of Aqueous Dispersion

The aqueous dispersion that had been dispersed for 20 min and left for 1 hour was hand-painted onto commercially available thermal paper (manufactured by Kokuyo Co., Ltd.; Tai-2010) (application amount of about 10 g/m$^2$). The ISO whiteness of this painted paper was measured with PF-10 (manufactured by Nippon Denshoku Industries Co., Ltd.).

Viscosity of Aqueous Dispersion when Left to Stand

The viscosity of the aqueous dispersion that had been dispersed for 20 min and left for 3 days was measured at 20° C.

Stability of Dispersion when Heated 100 mL of the dispersion that had been dispersed for 20 min was poured into a 200 mL beaker. The dispersion was subjected to heat-treatment by putting the beaker in a hot-water bath at 70° C. for 1 hour with the dispersion being stirred with Three-One Motor. The state of the dispersion during this heat-treatment was visually evaluated.

A: No viscosity increase or aggregation was observed, and the dispersion state was good.

B: The viscosity increased but dispersion was not gelated.

C: The viscosity increased and dispersion was gelated.

(2) Preparation of Thermosensitive Color-Developing Coating Liquid

A composition consisting of 50 parts of the above aqueous dispersion A, 100 parts of the aqueous dispersion B, 10 parts of colloidal silica (solid content 20%), 20 parts of styrene-butadiene latex (solid content 50%), 15 parts of stearic acid amide dispersion (solid content 20%), and 1 part of an aqueous solution of dioctylsulfosuccinic acid (solid content 5%) was mixed, and thereby coating liquid for thermosensitive coloring layer was prepared.

(3) Production of Thermal Recording Paper

The above coating liquid was applied onto a surface of base paper (high-quality paper with basis weight of 60 g/m$^2$) using a wire-bar coater with an amount of 6 g/m$^2$ (solid content conversion), and the paper was dried at 50° C. for 10 min. Then, the paper was subjected to surface treatment using a supercalender (linear pressure: 30 kg/cm) so that the thermal recording paper was produced. The performance of the obtained thermal recording paper was evaluated by the following methods.

Color Developing Sensitivity of Thermal Recording Paper

Printing was performed on the thermal recording paper using a thermal printing tester having a thin film head manufactured by Matsushita Electronic Components co., Ltd. under conditions of head power of 0.45 W/dot per line, recording time of 20 msec/L, and scanning density 8×385 dot/mm, while changing the pulse width in the range of 0.0 to 1.2 msec every 1 msec. The print density was measured with a Macbeth densitometer RD-914, and the pulse width where the density became 1.0 was determined by calculation. The smaller value of this means a better sensitivity (thermal response).

Hunter Whiteness of Unprinted Part in Background

The whiteness of the background was measured with a digital Hunter whiteness tester (manufactured by Toyo Seiki Seisaku-sho, LTD.) with 10 sheets of the unprinted sample being piled. Each of measured results is shown in Table 2.

Examples 2 to 33

Coating liquid was prepared (a heat-sensitive dye and a developer were dispersed) and the thermal recording paper was produced in a manner similar to Example 1 expect that the polyvinyl alcohol-based resin (A), acetylene glycol (B), and the ethoxylate (C) of acetylene glycol used in Example 1 were changed to those shown in Table 1. The results are shown in Table 2.

Comparative Examples 1 to 3

Coating liquid was prepared (a heat-sensitive dye and a developer were dispersed) and the thermal recording paper was produced in a manner similar to Example 1 expect that the polyvinyl alcohol-based resin (A), acetylene glycol (B), and the ethoxylate (C) of acetylene glycol used in Example 1 were changed to those shown in Table 1. The results are shown in Table 2.

TABLE 1

| | Polymerization conditions | | | | | | | | Saponification condition | Vinyl alcohol based polymer (A) | | | |
|---|---|---|---|---|---|---|---|---|---|---|---|---|---|
| | Vinyl acetate (g) | Monomer containing a carboxyl group | | Chain transfer agent | Used amount (g) | Methanol (g) | AIBN (g) | Polymerization time | Polymerization rate (%) | Alkali molar ratio | Saponification degree (mole %) | 10 wt % viscosity (mPas) | S (mole %) | Absorbance at 280 nm |
| | | Kind | Used amount (g) | | | | | | | | | | | |
| PVA-1  | 2400 | IA   | 69.2  | A-Alde | 150 | 600  | 4.5 | 5 | 90 | 0.045 | 88 | 10 | 2    | 0.66 |
| PVA-2  | 1050 | IA   | 30    | A-Alde | 40  | 1950 | 5   | 5 | 90 | 0.045 | 88 | 10 | 2    | 0.49 |
| PVA-3  | 1350 | IA   | 38    | A-Alde | 60  | 1650 | 4.8 | 5 | 90 | 0.045 | 88 | 10 | 2    | 0.55 |
| PVA-4  | 2850 | IA   | 82    | A-Alde | 200 | 150  | 3.8 | 5 | 90 | 0.045 | 88 | 10 | 2    | 0.76 |
| PVA-5  | 3000 | IA   | 40    | A-Alde | 300 | 0    | 3.5 | 5 | 90 | 0.045 | 88 | 10 | 2    | 0.82 |
| PVA-6  | 2400 | IA   | 69.2  | A-Alde | 150 | 600  | 4.5 | 5 | 90 | 0.035 | 70 | 10 | 2    | 0.66 |
| PVA-7  | 2400 | IA   | 69.2  | A-Alde | 150 | 600  | 4.5 | 5 | 90 | 0.038 | 75 | 10 | 2    | 0.66 |
| PVA-8  | 2400 | IA   | 69.2  | A-Alde | 150 | 600  | 4.5 | 5 | 90 | 0.04  | 80 | 10 | 2    | 0.66 |
| PVA-9  | 2400 | IA   | 69.2  | A-Alde | 150 | 600  | 4.5 | 5 | 90 | 0.047 | 93 | 10 | 2    | 0.66 |
| PVA-10 | 2400 | IA   | 69.2  | A-Alde | 150 | 600  | 4.5 | 5 | 90 | 0.05  | 95 | 10 | 2    | 0.66 |
| PVA-11 | 2700 | IA   | 77.5  | A-Alde | 100 | 600  | 2.8 | 5 | 90 | 0.045 | 88 | 20 | 2    | 0.66 |
| PVA-12 | 2550 | IA   | 73.3  | A-Alde | 100 | 600  | 3.2 | 5 | 90 | 0.045 | 88 | 15 | 2    | 0.66 |
| PVA-13 | 2100 | IA   | 59.9  | A-Alde | 180 | 600  | 5.3 | 5 | 90 | 0.045 | 88 | 7  | 2    | 0.66 |
| PVA-14 | 2700 | IA   | 77.5  | A-Alde | 350 | 600  | 5.5 | 5 | 90 | 0.045 | 88 | 5  | 2    | 0.66 |
| PVA-15 | 2400 | IA   | 104.3 | A-Alde | 150 | 600  | 4.5 | 5 | 90 | 0.055 | 88 | 10 | 3    | 0.66 |
| PVA-16 | 2400 | IA   | 94    | A-Alde | 150 | 600  | 4.5 | 5 | 90 | 0.052 | 88 | 10 | 2.7  | 0.66 |
| PVA-17 | 2400 | IA   | 20.6  | A-Alde | 150 | 600  | 4.5 | 5 | 90 | 0.031 | 88 | 10 | 0.6  | 0.66 |
| PVA-18 | 2400 | IA   | 6.7   | A-Alde | 150 | 600  | 4.5 | 5 | 90 | 0.028 | 88 | 10 | 0.3  | 0.66 |
| PVA-19 | 2400 | IA   | 1.65  | A-Alde | 150 | 600  | 4.5 | 5 | 90 | 0.026 | 88 | 10 | 0.05 | 0.66 |
| PVA-20 | 900  | IA   | 25.8  | None   | 0   | 4100 | *1  | 5 | 90 | 0.045 | 88 | 10 | 2    | 0.04 |
| PVA-21 | 900  | None | 0     | None   | 0   | 4100 | *1  | 5 | 90 | 0.025 | 88 | 10 | 0    | 0.01 |

*1 NPP was used.

TABLE 2

| | Vinyl alcohol-based polymer (A) | | Acetylene glycol (B) | | Ethoxylate (C) of acetylene glycol | | Olefin/maleic acid copolymer (D) | |
|---|---|---|---|---|---|---|---|---|
| | Kind | Part | Kind | Part | Kind | Part | Kind | Part |
| Example 1  | PVA-1  | 100 | Surfynol 104E | 2    | None         | 0    | None     | 0    |
| Example 2  | PVA-2  | 100 | Surfynol 104E | 2    | None         | 0    | None     | 0    |
| Example 3  | PVA-3  | 100 | Surfynol 104E | 2    | None         | 0    | None     | 0    |
| Example 4  | PVA-4  | 100 | Surfynol 104E | 2    | None         | 0    | None     | 0    |
| Example 5  | PVA-5  | 100 | Surfynol 104E | 2    | None         | 0    | None     | 0    |
| Example 6  | PVA-6  | 100 | Surfynol 104E | 2    | None         | 0    | None     | 0    |
| Example 7  | PVA-7  | 100 | Surfynol 104E | 2    | None         | 0    | None     | 0    |
| Example 8  | PVA-8  | 100 | Surfynol 104E | 2    | None         | 0    | None     | 0    |
| Example 9  | PVA-9  | 100 | Surfynol 104E | 2    | None         | 0    | None     | 0    |
| Example 10 | PVA-10 | 100 | Surfynol 104E | 2    | None         | 0    | None     | 0    |
| Example 11 | PVA-11 | 100 | Surfynol 104E | 2    | None         | 0    | None     | 0    |
| Example 12 | PVA-12 | 100 | Surfynol 104E | 2    | None         | 0    | None     | 0    |
| Example 13 | PVA-13 | 100 | Surfynol 104E | 2    | None         | 0    | None     | 0    |
| Example 14 | PVA-14 | 100 | Surfynol 104E | 2    | None         | 0    | None     | 0    |
| Example 15 | PVA-15 | 100 | Surfynol 104E | 2    | None         | 0    | None     | 0    |
| Example 16 | PVA-16 | 100 | Surfynol 104E | 2    | None         | 0    | None     | 0    |
| Example 17 | PVA-17 | 100 | Surfynol 104E | 2    | None         | 0    | None     | 0    |
| Example 18 | PVA-18 | 100 | Surfynol 104E | 2    | None         | 0    | None     | 0    |
| Example 19 | PVA-19 | 100 | Surfynol 104E | 2    | None         | 0    | None     | 0    |
| Example 20 | PVA-1  | 100 | Surfynol 104E | 0.01 | None         | 0    | None     | 0    |
| Example 21 | PVA-1  | 100 | Surfynol 104E | 0.3  | None         | 0    | None     | 0    |
| Example 22 | PVA-1  | 100 | Surfynol 104E | 0.5  | None         | 0    | None     | 0    |
| Example 23 | PVA-1  | 100 | Surfynol 104E | 7    | None         | 0    | None     | 0    |
| Example 24 | PVA-1  | 100 | Surfynol 104E | 10   | None         | 0    | None     | 0    |
| Example 25 | PVA-1  | 100 | None          | 0    | Surfynol 440 | 2    | None     | 0    |
| Example 26 | PVA-1  | 100 | None          | 0    | Surfynol 440 | 0.3  | None     | 0    |
| Example 27 | PVA-1  | 100 | None          | 0    | Surfynol 440 | 7    | None     | 0    |
| Example 28 | PVA-1  | 100 | Surfynol 104E | 2    | None         | 0    | Demol EP | 0.5  |
| Example 29 | PVA-1  | 100 | Surfynol 104E | 2    | None         | 0    | Demol EP | 0.05 |
| Example 30 | PVA-1  | 100 | Surfynol 104E | 2    | None         | 0    | Demol EP | 0.2  |
| Example 31 | PVA-1  | 100 | Surfynol 104E | 2    | None         | 0    | Demol EP | 3    |
| Example 32 | PVA-1  | 100 | Surfynol 104E | 2    | None         | 0    | Demol EP | 5    |
| Example 33 | PVA-1  | 100 | None          | 0    | None         | 0    | None     | 0    |
| Comparative example 1 | PVA-20 | 100 | Surfynol 104E | 2 | None | 0 | None | 0 |

TABLE 2-continued

| | | | | | | | | | |
|---|---|---|---|---|---|---|---|---|---|
| Comparative example 2 | PVA-20 | 100 | Surfynol 104E | 2 | None | 0 | Demol EP | 0.5 |
| Comparative example 3 | PVA-21 | 100 | None | 0 | None | 0 | None | 0 |

| | Evaluation of dispersion | | | | | Evaluation of thermal paper | |
|---|---|---|---|---|---|---|---|
| | Particle diameter (μm) | Viscosity (mPas) | Whiteness | Viscosity of dispersion after left to stand (mPas) | State of dispersion after heated | Color developing sensitivity (ms) | Whiteness of background |
| Example 1 | 0.44 | 55 | 80 | 54 | B | 0.6 | 81 |
| Example 2 | 0.53 | 56 | 80 | 55 | B | 0.82 | 81 |
| Example 3 | 0.51 | 56 | 80 | 55 | B | 0.8 | 81 |
| Example 4 | 0.42 | 55 | 80 | 75 | B | 0.58 | 81 |
| Example 5 | 0.4 | 56 | 80 | 77 | B | 0.58 | 81 |
| Example 6 | 0.45 | 55 | 80 | 76 | B | 0.6 | 81 |
| Example 7 | 0.45 | 57 | 80 | 78 | B | 0.6 | 81 |
| Example 8 | 0.45 | 56 | 80 | 55 | B | 0.6 | 81 |
| Example 9 | 0.55 | 60 | 80 | 82 | B | 0.84 | 81 |
| Example 10 | 0.57 | 65 | 80 | 86 | B | 0.85 | 81 |
| Example 11 | 0.46 | 650 | 80 | 630 | B | 0.61 | 81 |
| Example 12 | 0.46 | 540 | 80 | 510 | B | 0.61 | 81 |
| Example 13 | 0.56 | 49 | 80 | 66 | B | 0.9 | 81 |
| Example 14 | 0.61 | 180 | 80 | 240 | B | 0.91 | 81 |
| Example 15 | 0.45 | 58 | 71 | 55 | B | 0.59 | 70 |
| Example 16 | 0.46 | 58 | 73 | 55 | B | 0.61 | 72 |
| Example 17 | 0.53 | 340 | 80 | 440 | B | 0.82 | 81 |
| Example 18 | 0.56 | 510 | 80 | 780 | B | 0.85 | 81 |
| Example 19 | 0.58 | 720 | 80 | 890 | B | 0.86 | 81 |
| Example 20 | 0.67 | 53 | 80 | 155 | B | 0.86 | 81 |
| Example 21 | 0.55 | 53 | 80 | 55 | B | 0.83 | 81 |
| Example 22 | 0.51 | 55 | 80 | 57 | B | 0.8 | 81 |
| Example 23 | 0.51 | 55 | 73 | 57 | B | 0.8 | 73 |
| Example 24 | 0.51 | 55 | 70 | 57 | B | 0.8 | 71 |
| Example 25 | 0.44 | 54 | 80 | 55 | B | 0.6 | 81 |
| Example 26 | 0.56 | 54 | 80 | 55 | B | 0.83 | 81 |
| Example 27 | 0.51 | 55 | 73 | 56 | B | 0.8 | 73 |
| Example 28 | 0.43 | 55 | 80 | 54 | A | 0.6 | 81 |
| Example 29 | 0.42 | 58 | 80 | 55 | B | 0.59 | 81 |
| Example 30 | 0.43 | 62 | 80 | 60 | B | 0.6 | 81 |
| Example 31 | 0.43 | 120 | 67 | 120 | A | 0.6 | 66 |
| Example 32 | 0.42 | 150 | 65 | 155 | A | 0.58 | 65 |
| Example 33 | 0.58 | 55 | 80 | 54 | B | 0.93 | 81 |
| Comparative example 1 | 0.68 | 55 | 80 | 55 | B | 0.93 | 81 |
| Comparative example 2 | 0.67 | 55 | 80 | 54 | A | 0.92 | 81 |
| Comparative example 3 | 0.72 | 680 | 80 | 1820 | C | 0.98 | 82 |

From the results in Tables 1 and 2, it has been found that when the polyvinyl alcohol-based resin (A) used for the thermal recording material of the present invention was used as a dispersant for the thermosensitive coloring layer, a dispersion that contains particles with a small particle diameter, shows hardly any premature graying, and exhibits excellent dispersion stability and storage stability when heated can be obtained. Further, it has been found that the thermal recording material containing this dispersion in the thermosensitive coloring layer has good color developing sensitivity (Examples 1 to 33). In particular, when the polyvinyl alcohol-based resin (A) and acetylene glycol (B) were used as a dispersant for the thermosensitive coloring layer as well as when the polyvinyl alcohol-based resin (A) and the ethoxylate (C) of acetylene glycol were used as a dispersant for the thermosensitive coloring layer, various properties became better (Examples 1 to 32). Furthermore, the dispersion with extremely good dispersion stability can be obtained by allowing the salt (D) of an olefin/maleic acid copolymer to coexist (Examples 28 to 32). On the other hand, it has been found that when the vinyl alcohol type polymer having an absorbance at 280 nm of less than 0.20 obtained from the ultraviolet absorption spectrum of the 0.1 wt % aqueous solution thereof was used as a dispersant for the thermosensitive coloring layer, a dispersion that contains particles with a small particle diameter was not obtained, and that the thermal recording material containing this dispersion does not have sufficient color developing sensitivity (Comparative examples 1 to 3).

INDUSTRIAL APPLICABILITY

The thermal recording material of the present invention is excellent in not only color developing sensitivity and whiteness of the background but also high-speed printing property and image resolution because the dispersion that contains particles with a small particle diameter, shows hardly any premature graying, and exhibits excellent dispersion stability and storage stability when heated is obtained owing to using polyvinyl alcohol-based resin (A). The thermal recording material of the present invention can be suitably used in the field, such as facsimile, where high-speed printing is required, by making good use of these properties.

The invention claimed is:

1. A thermal recording material comprising a support and a thermosensitive coloring layer that is provided on the support, wherein the thermosensitive coloring layer comprises:
   an electron-donating colorless dye;
   an electron-accepting compound; and
   a polyvinyl alcohol-based resin (A) containing a carboxyl group that has been produced by saponification of a polyvinyl ester obtained by polymerization in the presence of an aldehyde or a ketone, wherein the polyvinyl alcohol-based resin (A) containing a carboxyl group has an absorbance at 280 nm of 0.20 to 0.85 obtained from an ultraviolet absorption spectrum of a 0.1 wt % aqueous solution thereof.

2. The thermal recording material according to claim 1, wherein the thermosensitive coloring layer further comprises:
   0.01 to 10 parts by weight of acetylene glycol (B) represented by the following general formula (I), relative to 100 parts by weight of the polyvinyl alcohol-based resin (A) containing a carboxyl group:

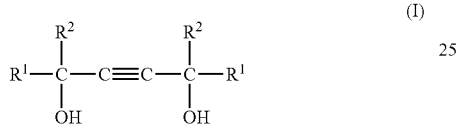

(I)

wherein $R^1$ and $R^2$ each independently represent an alkyl group having 1 to 4 carbons.

3. The thermal recording material according to claim 1, wherein the thermosensitive coloring layer further comprises:
   0.01 to 10 parts by weight of an ethoxylate of acetylene glycol (C) represented by the following general formula (II), relative to 100 parts by weight of the polyvinyl alcohol-based resin (A) containing a carboxyl group:

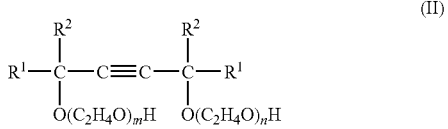

(II)

wherein $R^1$ and $R^2$ each independently represent an alkyl group having 1 to 4 carbons, m and n each independently represent an integer of 1 to 25, and m+n is 1 to 40.

4. The thermal recording material according to claim 1, wherein the thermosensitive coloring layer further comprises:
   0.01 to 5 parts by weight of a salt (D) of an olefin/maleic acid copolymer, relative to 100 parts by weight of the polyvinyl alcohol-based resin (A) containing a carboxyl group.

5. The thermal recording material according to claim 4, wherein the salt (D) of an olefin/maleic acid copolymer is a salt of a diisobutylene-maleic anhydride copolymer.

6. The thermal recording material according to claim 1, wherein a mole % content S of monomer units having a carboxyl group relative to total content of monomer units in the polyvinyl alcohol-based resin (A) containing a carboxyl group is 0.05 to 3 mole %.

7. The thermal recording material according to claim 1, wherein a viscosity measured on a 10 wt % solution of the polyvinyl alcohol-based resin (A) containing a carboxyl group with a B-type viscometer at 20° C. is 5 to 20 mPas.

8. The thermal recording material according to claim 1, wherein the polymerization is carried out in the presence of the aldehyde.

9. The thermal recording material according to claim 8, wherein the aldehyde is selected from the group consisting of acetaldehyde, propionaldehyde, butyraldehyde, and benzaldehyde.

10. The thermal recording material according to claim 1, wherein the polymerization is carried out in the presence of the ketone.

11. The thermal recording material according to claim 10, wherein the ketone is selected from the group consisting of acetone, methyl ethyl ketone, hexanone, and cyclohexanone.

12. The thermal recording material according to claim 1, wherein the polymerization is a copolymerization of an unsaturated monomer having a carboxyl group with a vinyl ester monomer that is carried out in the presence of the aldehyde.

13. The thermal recording material according to claim 12,
   wherein the unsaturated monomer having a carboxyl group is selected from the group consisting of fumaric acid, maleic acid, itaconic acid, fumaric anhydride, maleic anhydride, itaconic anhydride, and trimellitic anhydride, and
   wherein the vinyl ester monomer is selected from the group consisting of vinyl formate, vinyl acetate, vinyl propionate, vinyl pivalate, and vinyl versatate.

14. The thermal recording material according to claim 12, wherein the aldehyde is selected from the group consisting of acetaldehyde, propionaldehyde, butyraldehyde, and benzaldehyde.

15. The thermal recording material according to claim 1, wherein the polymerization is a copolymerization of an unsaturated monomer having a carboxyl group with a vinyl ester monomer that is carried out in the presence of the ketone.

16. The thermal recording material according to claim 15,
   wherein the unsaturated monomer having a carboxyl group is selected from the group consisting of fumaric acid, maleic acid, itaconic acid, fumaric anhydride, maleic anhydride, itaconic anhydride, and trimellitic anhydride, and
   wherein the vinyl ester monomer is selected from the group consisting of vinyl formate, vinyl acetate, vinyl propionate, vinyl pivalate, and vinyl versatate.

17. The thermal recording material according to claim 15, wherein the ketone is selected from the group consisting of acetone, methyl ethyl ketone, hexanone, and cyclohexanone.

18. The thermal recording material according to claim 1, wherein the polyvinyl alcohol-based resin (A) containing a carboxyl group has an absorbance at 280 nm of 0.30 to 0.75 obtained from an ultraviolet absorption spectrum of a 0.1 wt % aqueous solution thereof.

19. The thermal recording material according to claim 1, wherein the polyvinyl alcohol-based resin (A) containing a carboxyl group has an absorbance at 280 nm of 0.50 to 0.70 obtained from an ultraviolet absorption spectrum of a 0.1 wt % aqueous solution thereof.

* * * * *